United States Patent
Lara

(10) Patent No.: US 8,061,482 B2
(45) Date of Patent: *Nov. 22, 2011

(54) TENSIONER FOR SAFETY LINE WITH ENERGY ABSORPTION DEVICE

(75) Inventor: Pascal Lara, Nice (FR)

(73) Assignee: Capital Safety Group EMEA, Carros Cedex (FR)

( * ) Notice: Subject to any disclaimer, the term of this patent is extended or adjusted under 35 U.S.C. 154(b) by 549 days.

This patent is subject to a terminal disclaimer.

(21) Appl. No.: 11/913,183

(22) PCT Filed: May 23, 2006

(86) PCT No.: PCT/EP2006/062548
§ 371 (c)(1),
(2), (4) Date: Oct. 31, 2007

(87) PCT Pub. No.: WO2006/125786
PCT Pub. Date: Nov. 30, 2006

(65) Prior Publication Data
US 2008/0184534 A1    Aug. 7, 2008

(30) Foreign Application Priority Data
May 24, 2005   (FR) ...................... 05 51358

(51) Int. Cl.
*A47L 3/04* (2006.01)
(52) U.S. Cl. ............................ 182/3; 182/45; 52/223.13
(58) Field of Classification Search ............... 182/3, 45; 254/262, 134.3 FT, 134 R, 245, 246, 387; 24/69 WT, 71 CT, 129 A, 115 A, 115 F, 115 G, 24/122.6; 104/117; 211/119.16; 52/223.13; 188/372
See application file for complete search history.

(56) References Cited

U.S. PATENT DOCUMENTS

| | | | | |
|---|---|---|---|---|
| 3,087,584 A | * | 4/1963 | Jackson et al. | 188/372 |
| 3,965,543 A | * | 6/1976 | Connors | 24/136 R |
| 4,558,584 A | | 12/1985 | Myers | |
| 4,790,410 A | * | 12/1988 | Sharp et al. | 182/36 |
| 5,015,023 A | * | 5/1991 | Hall | 294/102.1 |
| 5,015,205 A | | 5/1991 | Franks, Jr. | |

(Continued)

FOREIGN PATENT DOCUMENTS

EP    272908 A2 * 6/1988

(Continued)

OTHER PUBLICATIONS

Flap Noun a. A flat, usually thin piece attached at only one side. The American Heritage® Dictionary of the English Language, Fourth Edition, Copyright ©2000 by Houghton Mifflin Company.

(Continued)

*Primary Examiner* — Katherine Mitchell
*Assistant Examiner* — Daniel Cahn
(74) *Attorney, Agent, or Firm* — IPLM Group, P.A.

(57) ABSTRACT

An energy absorption device for a safety line, includes two sections (1, 2) capable of being set in relative motion with friction so that it absorbs energy. This energy absorption device is designed so that one of the sections has at least two parallel cable portions (6a, 6b), each capable of being displaced between a pair of jaws (4a, 4b) formed on the other section. A tensioner for a safety line incorporating such a device is disclosed. Application to the installations for working under difficult conditions with the installation of safety lines.

9 Claims, 4 Drawing Sheets

U.S. PATENT DOCUMENTS

| | | | |
|---|---|---|---|
| 5,297,651 | A | 3/1994 | Vandelinde et al. |
| 5,400,868 | A | 3/1995 | Ellis et al. |
| 5,458,214 | A | 10/1995 | Olson et al. |
| 6,001,098 | A | 12/1999 | Metz-Stavenhagen et al. |
| 6,076,236 | A * | 6/2000 | DeFrance .................. 24/136 R |
| 6,338,399 | B1 | 1/2002 | Choate |
| 6,425,458 | B1 | 7/2002 | Soll |
| 6,761,722 | B2 * | 7/2004 | Cole et al. ....................... 606/74 |
| 7,163,083 | B2 | 1/2007 | Argoud |
| 2002/0134618 | A1 | 9/2002 | Timmermans |
| 2004/0193217 | A1 | 9/2004 | Lubbers et al. |
| 2005/0033366 | A1* | 2/2005 | Cole et al. ..................... 606/232 |
| 2005/0034920 | A1* | 2/2005 | Anderson ........................ 182/3 |
| 2005/0146071 | A1 | 7/2005 | Tiemeier et al. |
| 2005/0177022 | A1 | 8/2005 | Chu et al. |
| 2006/0113147 | A1 | 6/2006 | Harris, Jr. |
| 2008/0006750 | A1 | 1/2008 | Flux |
| 2008/0156587 | A1 | 7/2008 | Lara |

FOREIGN PATENT DOCUMENTS

| | | | |
|---|---|---|---|
| EP | 0 273 673 | A1 | 7/1988 |
| GB | 2 336 617 | A | 10/1999 |
| GB | 2 354 052 | A | 3/2001 |
| GB | 2 403 256 | A | 12/2004 |
| WO | WO 93/06384 | | 4/1993 |
| WO | 99/22816 | A | 3/1999 |
| WO | 00/47825 | A | 8/2000 |
| WO | WO 00/47285 | | 8/2000 |
| WO | WO 01/87420 | A1 | 11/2001 |
| WO | WO 03/039680 | A1 | 5/2003 |
| WO | WO 2006/103259 | A1 | 10/2006 |

OTHER PUBLICATIONS

International Search Report of PCT/EP2006/062548 mailed Jul. 25, 2006.

International Search Report of PCT/EP2006/062544 mailed Jul. 28, 2006.

Non-Final Office Action for U.S. Appl. No. 11/913,180 mailed Jan. 7, 2010.

Final Office Action for U.S. Appl. No. 11/913,180 mailed Jun. 29, 2010.

U.S. Appl. No. 11/913,180, filed Oct. 31, 2007.
PCT/EP2006/062544, filed May 23, 2006, expired Nov. 24, 2007.
U.S. Appl. No. 11/913,183, filed Oct. 31, 2007.
PCT/EP2006/062548, filed May 23, 2006, expired Nov. 24, 2007.

* cited by examiner

TENSIONER FOR SAFETY LINE WITH ENERGY ABSORPTION DEVICE

This invention relates to an energy absorption device for a safety line, together with a tensioner for a safety line integrating such a device.

The invention is intended to be applied in the field of installations for making safe the work of personnel under dangerous conditions. More precisely, the invention relates to the installation of safety lines, also called life-lines, generally consisting of cables on which the personnel may secure themselves to prevent injuries in the event of accidental falls.

In particular, the tensioner according to the invention enables safety lines to be fitted on external elements such as fixed walls (walls or posts), whilst ensuring that they can be tensioned at a set level and the energy generated by possible shocks can be absorbed.

In this field the document WO-A-93 06384, for example, discloses an energy absorption device capable of being connected to a life-line cable and comprising a tubular jacket system in which a rod is able to perform a translatory movement whilst rubbing against the wall of the jacket in order to provide progressive energy absorption. In the case presented in WO-A-93 06384, the energy absorption is provided by causing a permanent radial deformation of the jacket during displacement of the rod.

This type of energy absorption device makes use of the stroke of a rod to absorb the shocks. The stroke of such a rod is relatively limited, unless a highly cumbersome device is provided. Moreover, the energy absorption cannot easily be adjusted on the basis of this prior art.

There is therefore a need for proposing an improved energy absorption device that remedies all or some of the disadvantages of these systems of prior art.

For this purpose the device of this invention has the advantage that it applies friction between jaws and a plurality of cable portions, which gives rise to a longer stroke because the cable can easily be wound in the storage position and unwound during the absorption of shocks. Furthermore, this arrangement preferably allows an adjustment of the relative friction between the cable and the jaws.

A compact, and particularly efficient assembly is therefore produced without being limited to a short stroke of the energy absorption element.

According to a preferred embodiment of the invention, the device comprises two cable portions so that the assembly is balanced when tension is applied to the safety line produced in the event of accidental shocks.

Other purposes and advantages will be apparent from the following description of a preferred embodiment of the invention, which is not exhaustive.

First of all it must be borne in mind that this invention relates to an energy absorption device for a safety line, comprising two sections capable of being set in relative motion with friction to ensure that the energy is absorbed. This device is such that one of the sections comprises at least two parallel cable portions, each capable of being displaced between a pair of jaws formed on the other section.

According to preferred embodiments, this device is designed so that:
  the pairs of jaws are formed by a stay with two cable passages,
  the cable portions are formed on the same cable on either side of a curve of the cable,
  a turning part is configured to guide the cable at the curve, enabling the tension on the two cable portions to be balanced and distributed,
  it comprises means for adjusting the frictional force exerted by the pairs of jaws on the cable portions,
  the adjusting means are jaw screwing means,
  the end of each cable portion includes a limit stop,
  it comprises fuse means so that the relative movement of the two sections is not initiated until a predetermined force threshold is exceeded,
  the fuse means are two fuse parts rigidly attached by a threaded connection, each integral with a different section and configured so that the threaded connection is broken beyond a predetermined force threshold,
  the threaded connection is formed between the turning part and a frame for supporting the pairs of jaws.

The invention also relates to a tensioner for a safety line comprising on the one hand means for fixing to an external element and on the other hand means for connecting a safety line cable. This tensioner comprises an energy absorption device for a safety line according to the invention.

This tensioner is advantageously, but not exhaustively, designed so that:
  the fixing means are formed so that they are integral with the section comprising the pairs of jaws and the means of connection are formed in the section comprising the cable portions,
  the means of connection comprise a sleeve for crimping the end of the safety line, said sleeve being integral with a rod configured to perform a translatory movement relative to the remainder of the section comprising the cable portions in opposition to elastic return means,
  the elastic return means are a spring mounted around the rod,
  it comprises a case delimiting a storage volume in the winding of the cable portions.

The appended drawings are given as an example and do not limit the invention. They represent only one embodiment of the invention and allow it to be easily understood.

The case of an energy absorption device incorporated in a tensioner is described below. This case is not limiting, and the device may, for example, be applied to anchoring posts on a roof or other surface.

The tensioner presented here generally comprises a first end provided with a sleeve 11 enabling a safety line cable to be fixed by crimping.

At the other end of the tensioner fixing means 15 are provided to connect the tensioner to an external element such as a fixing system on a wall or post, or even to another safety line cable.

Figure 1:
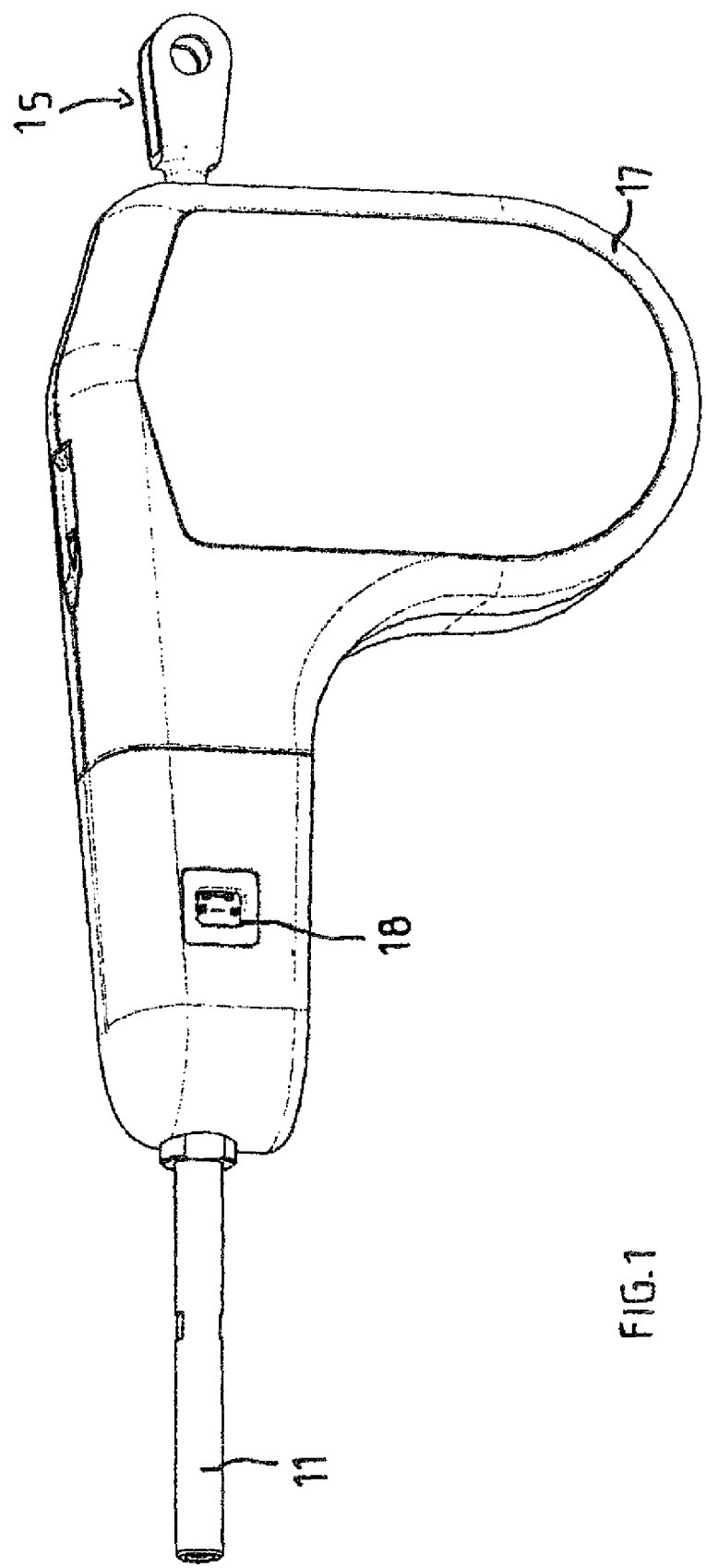
FIG. 1 shows a general external view of a tensioner of the invention in the normal position.
Figure 2:
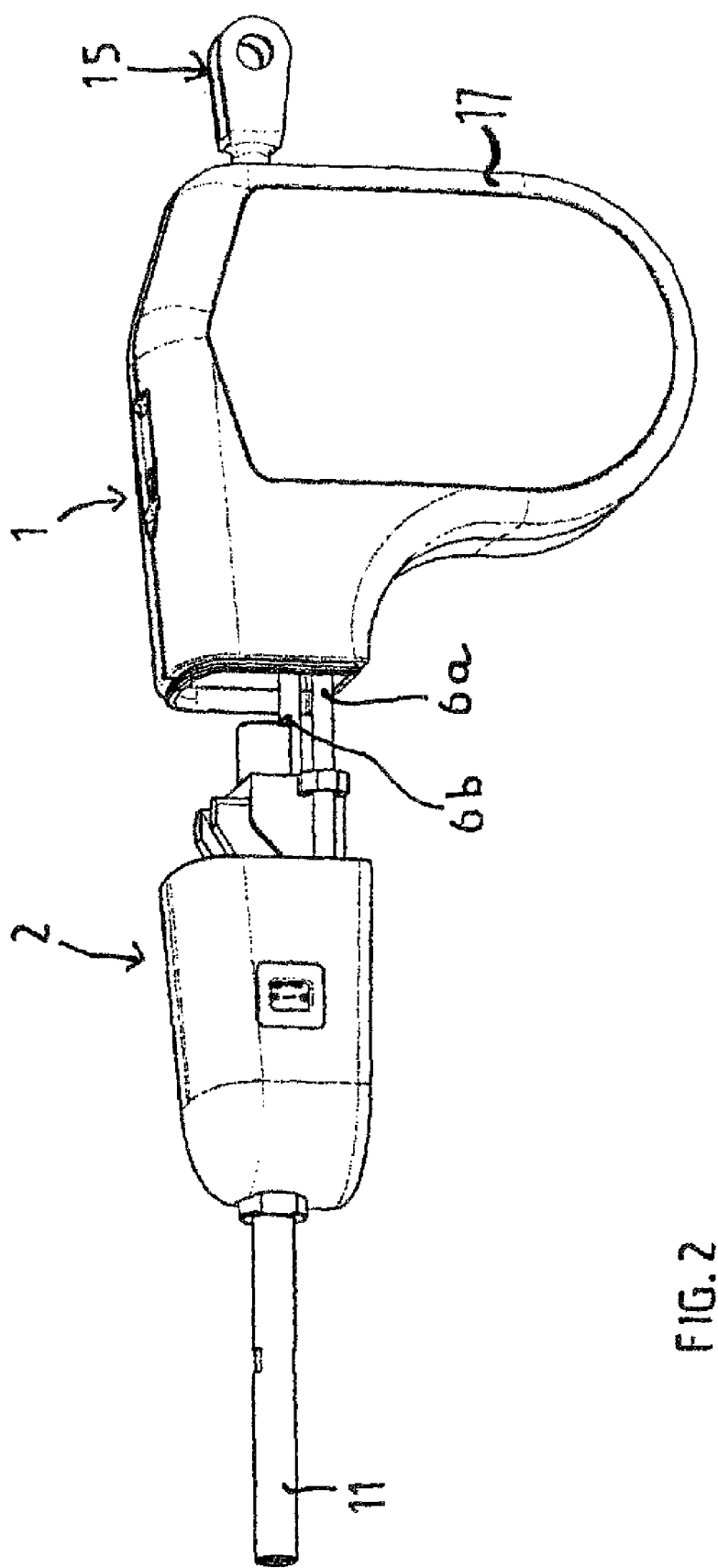
FIG. 2 shows the same tensioner in the energy absorption position.

Between these two ends the tensioner comprises a mechanism covered with a case 17, an example of which is shown in FIGS. 1 and 2.

In the inner volume of case 17 are formed a tension system and an energy absorption device.

Figure 3:
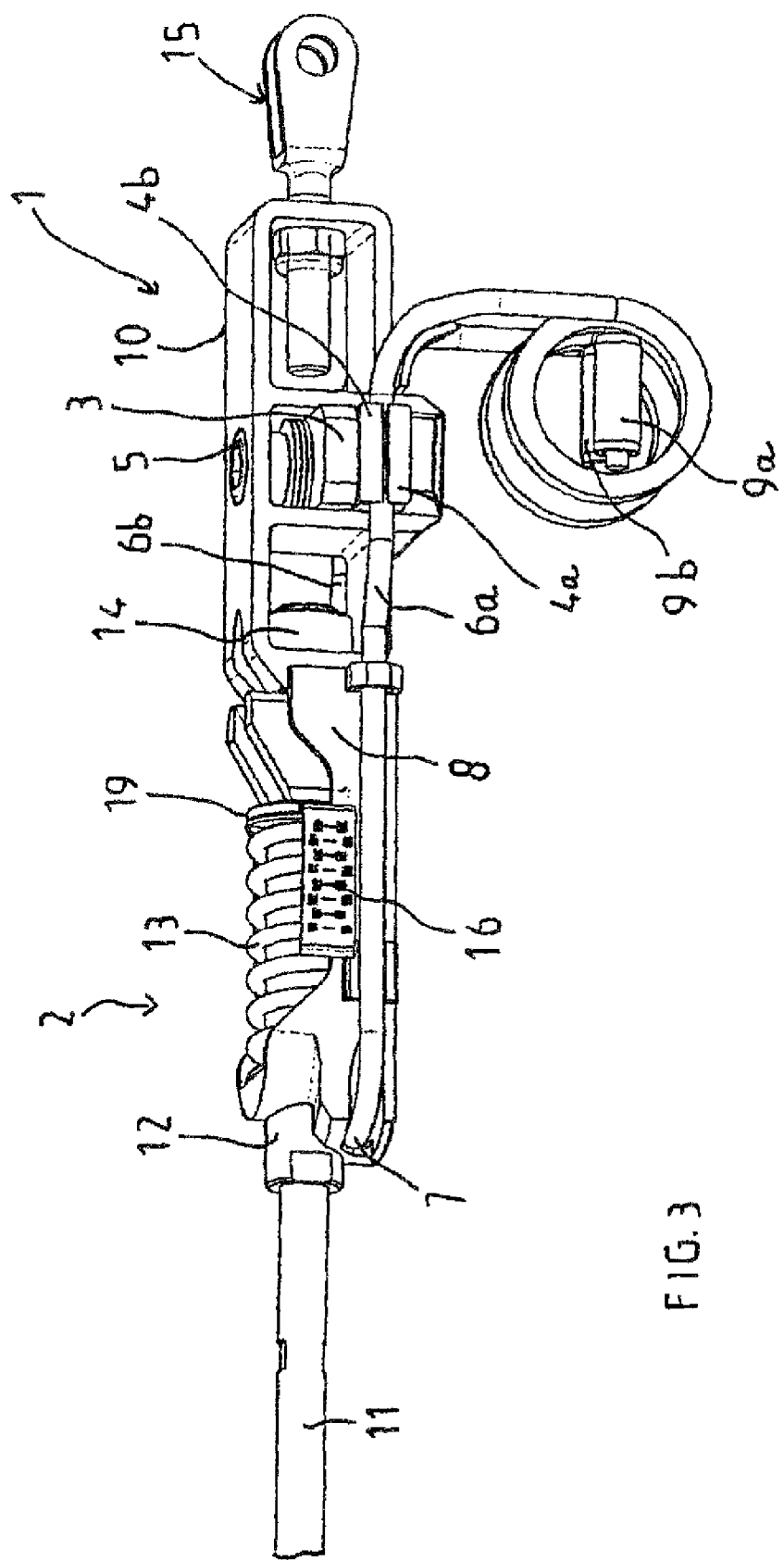
FIG. 3 shows in more detail an embodiment of the internal mechanisms of the tensioner incorporating an energy absorption device.
Figure 4:
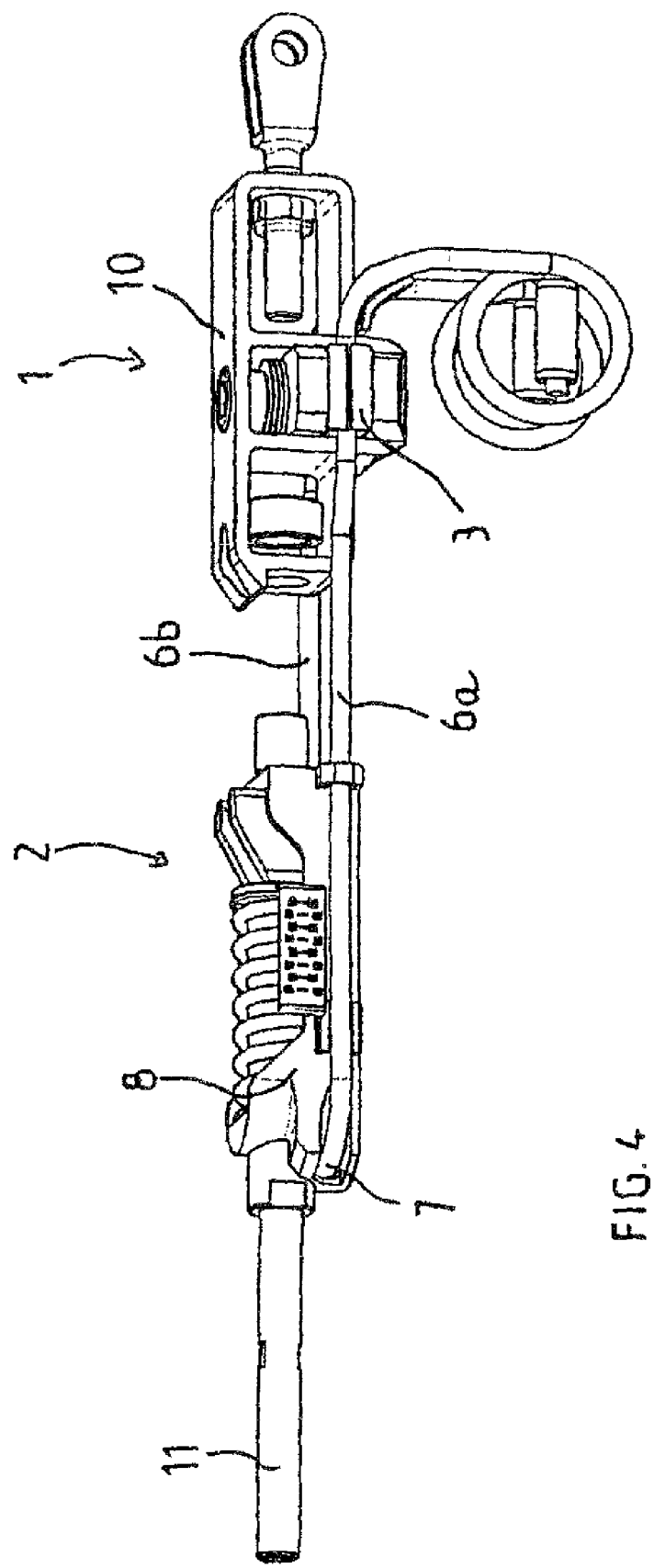
FIG. 4 shows this same embodiment in the energy absorption position.

Referring to FIG. 3, the energy absorption device comprises two sections 1, 2 that move relative to each other, the relative position of which during the absorption of shocks is shown in FIG. 4.

One of the sections, referred to below as fixed section 1, comprises a frame 10, a metal frame for example, on which are mounted fixing means 15, for example in the form of a threaded rod and nut system. Frame 10 also enables pairs of jaws 4a, 4b to be received, formed here in a single stay assembly 3 comprising an upper and lower plate in which are made two passages for cable portions 6a, 6b, essentially parallel with each other, and parallel with the direction of tension on the safety line.

Means of adjusting the tightness of stay 3 are provided here in the form of a tightening screw 5, whose tightening torque may be adjusted so that the relative friction between cable portions 6a, 6b and stay 3 is modified.

The two cable portions 6a, 6b comprise a free part ending by limit stop 9a, 9b and another end fitted to be leaded in a translatory movement during the absorption of shock.

As shown, the two cable portions 6a, 6b are advantageously constructed on the same able comprising a turning zone 7, essentially at its centre and in conjunction with the axis of sleeve 11 in order to produce two symmetrical portions 6a, 6b at various points along the longitudinal axis of the assembly.

For the purpose of guiding the cable forming portions 6a, 6b, a turning part 8 is formed with a longitudinal section and a rounded, essentially transversal section capable of receiving the cable at the level of turn 7, as shown in FIGS. 3 and 4.

By sliding relative to turning part 8, a rod 12, integral with sleeve 11, moves in opposition to elastic means of return, here in the form of a spring 13 surrounding rod 12 on a section of its length between turning part 8 and a cupped dish 19 at the end of rod 12. It is therefore understood that in the normal position (i.e. without energy absorption due to falls), the assembly consisting of the safety line cable, sleeve 11 and rod 12, may perform a slight translatory movement relative to the rest of the device, thereby constituting a light, reversible damping system.

The tension of the safety line cable may also be controlled by adjusting the length of the entire tensioner, in particular by adjusting fixing means 15, or even by providing a threaded connection between sleeve 11 and rod 12, enabling the assembly to be shortened or extended.

It will be noted that in order to adjust the cable tension an assembly of graduations 16 is provided, visible from the outside by means of a window 18 shown in FIGS. 1 and 2.

In the normal position sections 1 and 2 are positively connected, and their relative movement is only produced in the case of an accidental fall. To prevent any untimely release of the absorption device at low force levels, a fuse element is provided to ensure that the release does not occur until a predetermined threshold is exceeded.

In the case shown, the fuse means comprise a fuse nut 14, fitted to an internal section of body 10 and interacting, by threading, with one threaded rod end integral with turning part 8. For example, the rod section is formed in a relatively hard material such as steel, and fuse nut 14 is formed in a less hard material such as aluminium. Thus by adjusting the strength of the threaded connection between nut 14 and the threaded rod of turning part 8, sections 1 and 2 are not set in motion until a predetermined force threshold is exceeded. This threshold is easily adjustable, in particular by modifying the properties (e.g. height) and the material of nut 14.

An example of the use of a tensioner of the invention is given below.

In the first place the tensioner is mounted on an external element such as a fixed wall, by fixing means 15. At its other end it is connected to the end of a safety line cable by crimping the cable in sleeve 11. During this stage, and afterwards by adjusting the length of the tensioner (in particular, by relative displacement of fixing means 15 and body 10, or sleeve 11 and rod 12), it is possible to adjust the tension applied to the life-line. A graduation system visible through a window 18 assists the operator for this purpose.

In the normal position of use, no movement between sections 1 and 2 is produced and a translation of rod 12 opposing spring 13 enables slight variations in tractive force applied by the safety line cable to the tensioner to be damped.

In the event of an accidental fall the person connected to the safety line exerts an additional tension on the safety line cable, and consequently on the tensioner. At this level of force the fuse connection is broken, in particular by tearing of the threads of fuse nut 14 in a material softer than the threaded rod. It will be readily understood that a relative movement between section 1 and section 2 is then possible by ensuring that turning part 8 is entrained with sleeve 11 and rod 12 from right to left, as shown in FIG. 4.

Case 17, in two portions, follows this movement, as shown in FIG. 2.

During this phase, portions 6a, 6b are displaced by rubbing on the walls of the passages formed in stay 3. This friction produces an energy absorption. If the displacement continues, limit stops 9a, 9b applied to the side of stay 3 are reached.

When the energy of the fall has been absorbed, at least partially, the assembly is fixed in the position of relative distance between sections 1 and 2, as shown in FIGS. 2 and 4.

The formation of two cable portions 6a, 6b enables the assembly to be balanced in the direction of tension and gives rise to two symmetrical zones of friction. Turning part 8 guarantees in this context the balancing and distribution of the tension on the two portions of cable 6a, 6b. Another advantage of this embodiment is to allow the use of cables of smaller diameter than if a single cable were to be formed, thereby guaranteeing greater winding capacity of the free end of cable portions 6a, 6b, and a greater length. These windings are received in a volume dedicated for this purpose formed in a cavity inside case 17.

| REFERENCES | |
|---|---|
| 1. | Fixed section |
| 2. | Mobile section |
| 3. | Stay |
| 4a, 4b. | Jaw |
| 5. | Tightening screw |
| 6a, 6b. | Cable portion |
| 7. | Turn |
| 8. | Turning part |
| 9a, 9b. | Limit stop |
| 10. | Frame |
| 11. | Crimping sleeve |
| 12. | Rod |
| 13. | Spring |
| 14. | Fuse nut |
| 15. | Fixing means |
| 16. | Graduations |
| 17. | Case |
| 18. | Window |
| 19. | Dished plate |

The invention claimed is:

1. A tensioner for a safety line comprising:
    two sections configured and arranged to be set in relative motion to each other to absorb energy;
    a cable having at least two cable portions engaged with the two sections, the at least two cable portions being parallel with each other;
    a pair of jaws coupled to one of the two sections, a portion of each of the at least two cable portions engaged between the pair of jaws;

a first one of the two sections configured and arranged to couple a safety line to the tensioner with a sleeve;

a second one of the two sections configured and arranged to be coupled to an external element;

the sleeve configured and arranged to move in relative motion to the first section, the sleeve configured and arranged to crimp the safety line therewithin;

a first fuse part coupled to the first one of the two sections; and a second fuse part coupled to the second of the two sections, the first fuse part coupled to the second fuse part by a threaded connection that is configured to break when a force acting on at least one of the first and second sections is beyond a predetermined force threshold.

2. The tensioner according to claim 1, further comprising:
a fixing member being capable of coupling the second one of the two sections to the external element.

3. The tensioner according to claim 1, further comprising:
a rod integral with the sleeve, the rod configured and arranged to perform a translatory movement relative to the first section in opposition to an elastic return.

4. The tensioner according to claim 3, wherein the elastic return comprises a spring mounted around the rod.

5. The tensioner according to claim 1, further comprising:
a case having a storage volume, free ends of the cable portions formed into windings, and the windings received within the storage volume of the case.

6. The tensioner according to claim 1, wherein the cable portions are formed from the cable and are positioned on either side of a curve of the cable.

7. The tensioner according to claim 1, comprising means for adjusting the frictional force exerted by the pair of jaws on the cable portions.

8. The tensioner according to claim 1, wherein each cable portion includes an end, the tensioner further comprising:
a limit stop coupled to each end of the cable portions.

9. The tensioner according to claim 1, wherein the first fuse part is made of a different material than the second fuse part.

* * * * *